United States Patent [19]

Sumiya et al.

US005769176A

[11] Patent Number: 5,769,176
[45] Date of Patent: Jun. 23, 1998

[54] DIAMOND SINTERED COMPACT AND A PROCESS FOR THE PRODUCTION OF THE SAME

[75] Inventors: Hitoshi Sumiya; Shuichi Satoh, both of Itami, Japan

[73] Assignee: Sumitomo Electric Industries, Ltd., Osaka, Japan

[21] Appl. No.: 675,932

[22] Filed: Jul. 5, 1996

[30]     Foreign Application Priority Data

| Jul. 7, 1995 | [JP] | Japan | 7-172094 |
| Jul. 7, 1995 | [JP] | Japan | 7-172095 |
| Aug. 10, 1995 | [JP] | Japan | 7-204264 |
| Aug. 10, 1995 | [JP] | Japan | 7-204265 |
| Aug. 10, 1995 | [JP] | Japan | 7-204266 |
| Aug. 28, 1995 | [JP] | Japan | 7-218758 |

[51] Int. Cl.$^6$ ................................................. B22F 7/06
[52] U.S. Cl. ................................. 175/434; 428/565
[58] Field of Search .............. 175/434; 75/232; 51/309; 428/565

[56]     References Cited

U.S. PATENT DOCUMENTS

| 3,913,280 | 10/1975 | Hall | 51/307 |
| 4,334,928 | 6/1982 | Hara et al. | 75/238 |
| 4,406,871 | 9/1983 | Samoilovich et al. | 423/446 |
| 5,370,944 | 12/1994 | Omori et al. | 428/565 |
| 5,395,700 | 3/1995 | Nakai et al. | 428/552 |

FOREIGN PATENT DOCUMENTS

| 1306951 | 9/1962 | France . |
| 52-139691 | 11/1977 | Japan . |
| 54-144414 | 11/1979 | Japan . |
| 2-302367 | 12/1990 | Japan . |

*Primary Examiner*—William P. Neuder
*Attorney, Agent, or Firm*—Wenderoth, Lind & Ponack, L.L.P.

[57]     ABSTRACT

The present invention provides a diamond sintered compact having a higher strength as well as more excellent heat resistance, breakage resistance and corrosion resistance, as compared with those of the prior art, which thus can effectively be applied to tool materials for cutting or polishing of non-ferrous metals or ceramics, and edge materials of drill bits for excavating petroleum. The feature of the diamond sintered compact contains 0.1 to 30 volume % of at least one compound containing at least one element selected from the group consisting of silicon and titanium, and oxygen and the balance of diamond, for example, a titanate of a metal selected from the group consisting of iron, cobalt, nickel and manganese.

48 Claims, No Drawings

DIAMOND SINTERED COMPACT AND A PROCESS FOR THE PRODUCTION OF THE SAME

BACKGROUND OF THE INVENTION

1. Field of the Invention

This invention relates to a diamond sintered body or compact, a process for the production of the same and a tool for cutting or excavating using the diamond sintered body. The diamond sintered body of the present invention is preferably applied to tool materials for cutting or polishing of non-ferrous metals or ceramics, edge materials of drill bits for excavating petroleum, etc.

2. Description of the Prior Art

As diamond sintered compacts, those are known using, as a sintering agent or binder, iron group metals such as Co, Ni, Fe, etc., ceramics such as SiC, etc., and have been utilized for cutting tools of non-ferrous metals or excavating bits on commercial scale.

Diamond sintered compacts using carbonates as a sintering agent have been known (Japanese Patent Laid-Open Publication Nos. 74766/1992 and 114966/1992).

In addition to the above described compacts, there are natural diamond sintered compacts (carbonado), which are not actually used on a commercial scale because the origins thereof are not clear, dispersion of the quality is large and the outputs thereof are very small.

A diamond sintered compact using an iron group metal such as Co, functioning as a catalyst capable of accelerating graphitization of diamond, has inferior heat resistance. Namely, the diamond is graphitized at about 700° C. in an inert gas atmosphere. Moreover, this sintered compact does not have such a high strength and tends to be broken because of the presence of the metal such as Co in the grain boundary of diamond grains, as a continuous phase, and there arises a problem that thermal deterioration tends to occur due to difference in thermal expansion between the metal and diamond.

In order to raise the heat resistance, it has been proposed to remove the metal in the above described grain boundary by an acid treatment. Thus, the heat resistance temperature is improved to about 1200° C., but the strength is largely lowered by about 30% because the sintered body becomes porous.

A diamond sintered body using SiC as a binder material is excellent in heat resistance, but exhibits a low strength because of the absence of binding of the diamond grains with each other.

On the other hand, a diamond sintered compact using a carbonate as a sintering agent is more excellent in heat resistance as compared with that using Co binder, but it meets with lowering of the strength of the compact, since decomposition of the carbonate starts at about 1000° C., and it cannot be applied to uses such as excavating bits, because the carbonate is readily dissolved in acids.

SUMMARY OF THE INVENTION

It is an object of the present invention to provide a diamond sintered compact having excellent breakage resistance, heat resistance and acid resistance, and a process for the production of the same, whereby the above described problems of the prior art can be solved.

It is another object of the present invention to provide a tool for cutting, polishing or excavating using the diamond sintered compact.

These objects can be attained by a diamond sintered compact comprising 0.1 to 30 volume % at least one of compound containing silicon and/or titanium and oxygen and the balance of diamond, for example, a diamond sintered compact comprising 0.1 to 30 volume % of a material consisting of a compound containing at least one metal selected from the group consisting of iron, cobalt, nickel and manganese, titanium and oxygen, and the balance of diamond.

DETAILED DESCRIPTION OF THE INVENTION

The inventors have made various efforts to solve the problems of the prior art and develop a diamond sintered compact having high strength as well as excellent heat resistance, breakage resistance, wear resistance and corrosion resistance, which can be synthesized at relatively moderate conditions and consequently, have reached the present invention.

Preferred embodiments of the present invention will now be illustrated in detail.

The first embodiment of the present invention consists in (1) a diamond sintered compact comprising 0.1 to 30 volume % of a material consisting of a compound containing at least one metal selected from the group consisting of iron, cobalt, nickel and manganese, titanium and oxygen, and the balance of diamond, in particular, including (2) the diamond sintered compact as described above in (1), wherein the compound containing at least one metal selected from the group consisting of iron, cobalt, nickel and manganese, titanium and oxygen is a titanate of a metal selected from the group consisting of iron, cobalt, nickel and manganese and (3) the diamond sintered compact as described above in (1), wherein the compound containing at least one metal selected from the group consisting of iron, cobalt, nickel and manganese, titanium and oxygen is a composite oxide or solid solution consisting of an oxide of a metal selected from the group consisting of iron, cobalt, nickel and manganese, and titanium oxide.

In addition, there are provided (4) a process for the production of the diamond sintered compact as described above in any one of (1) to (3), which comprises using a titanate of a metal selected from the group consisting of iron, cobalt, nickel and manganese, as a sintering agent, mixing a powder of the titanate with diamond powder, non-diamond carbon powder or mixed powders of diamond and non-diamond carbon, and maintaining and sintering the mixture under pressure and temperature conditions in the thermodynamically stable region of diamond, (5) a process for the production of the diamond sintered compact as described above in any one of (1) to (3), which comprises using a titanate of a metal selected from the group consisting of iron, cobalt, nickel and manganese, and titanium oxide, as a sintering agent, laminating a shaped body of this powder and a shaped body of diamond powder, shaped body of non-diamond carbon powder or shaped body of mixed powders of diamond and non-diamond carbon, and maintaining and sintering the laminate under pressure and temperature conditions in the thermodynamically stable region of diamond and (6) the process for the production of the diamond sintered compact as described above in (4) or (5), wherein a mixture of an oxide of a metal selected from the group consisting of iron, cobalt, nickel and manganese, and titanium oxide is used as a sintering agent in place of the titanate.

In each of these production processes, the sintering agent is added to the raw material powder so that it is present in a proportion of 0.1 to 30 volume % in the composition.

The second embodiment of the present invention consists in (1) a diamond sintered compact comprising 0.1 to 30 volume % of a material consisting of a compound containing titanium, at least one metal selected from the group consisting of alkali metals and alkaline earth metals, and oxygen, and the balance of diamond, in particular, including (2) the diamond sintered compact as described above in (1), wherein the compound containing titanium, at least one metal selected from the group consisting of alkali metals and alkaline earth metals, and oxygen is a titanate of a metal selected from the group consisting of alkali metals and alkaline earth metals and (3) the diamond sintered compact as described above in (1), wherein the compound containing titanium, at least one metal selected from the group consisting of alkali metals and alkaline earth metals, and oxygen is a composite oxide or solid solution consisting of an oxide of a metal selected from the group consisting of alkali metals and alkaline earth metals and titanium oxide.

In addition, there are provided (4) a process for the production of the diamond sintered compact as described above in any one of (1) to (3), which comprises using a titanate of a metal selected from the the group consisting of alkali metals and alkaline earth metals, as a sintering agent, mixing a powder of the titanate with diamond powder, non-diamond carbon powder or mixed powders of diamond and non-diamond carbon, and maintaining and sintering the mixture under pressure and temperature conditions in the thermodynamically stable region of diamond, (5) a process for the production of the diamond sintered compact as described above in any one of (1) to (3), which comprises using a titanate of a metal selected from the the group consisting of alkali metals and alkaline earth metals, as a sintering agent, laminating a shaped body of this powder and a shaped body of diamond powder, shaped body of non-diamond carbon powder or shaped body of mixed powders of diamond and non-diamond carbon, and maintaining and sintering the laminate under pressure and temperature conditions in the thermodynamically stable region of diamond and (6) the process for the production of the diamond sintered compact as described above in (4) or (5), wherein a mixture of an oxide of a metal selected from the group consisting of alkali metals and alkaline earth metals, and titanium oxide is used as the sintering agent in place of the titanate.

In each of these production processes, the sintering agent is added to the raw material powder so that it is present in a proportion of 0.1 to 30 volume % in the composition.

The third embodiment of the present invention consists in (1) a diamond sintered compact comprising 0.1 to 30 volume % of a material consisting of a compound containing a rare earth element, titanium and oxygen, and the balance of diamond, in particular, including (2) the diamond sintered compact as described above in (1), wherein the compound containing a rare earth element, titanium and oxygen is a titanate of a rare earth element and (3) the diamond sintered compact as described above in (1), wherein the compound containing a rare earth element, titanium and oxygen is a composite oxide or solid solution consisting of an oxide of a rare earth element and titanium oxide.

In addition, there are provided (4) a process for the production of the diamond sintered compact as described above in any one of (1) to (3), which comprises using a titanate of a rare earth element as a sintering agent, mixing a powder of the titanate with diamond powder, non-diamond carbon powder or mixed powders of diamond and non-diamond carbon, and maintaining and sintering the mixture under pressure and temperature conditions in the thermodynamically stable region of diamond, (5) a process for the production of the diamond sintered compact as described in any one of above (1) to (3), which comprises using a titanate of a rare earth element as a sintering agent, laminating a shaped body of this powder and a shaped body of diamond powder, shaped body of non-diamond carbon powder or shaped body of mixed powders of diamond and non-diamond carbon, and maintaining and sintering the laminate under pressure and temperature conditions in the thermodynamically stable region of diamond, and (6) the process for the production of the diamond sintered compact as described above in (4) or (5), which comprises using a mixture of an oxide of a rare earth element and titanium oxide, as another sintering agent.

In each of these production processes, the sintering agent is added to the raw material powder so that it is present in a proportion of 0.1 to 30 volume % in the composition.

The fourth embodiment of the present invention consists in (1) a diamond sintered compact comprising 0.1 to 30 volume % of a material consisting of a compound containing an alkaline earth metal, silicon and oxygen, and the balance of diamond, in particular, including (2) the diamond sintered compact as described above in (1), wherein the compound containing an alkaline earth metal, silicon and oxygen is a silicate of an alkaline earth metal and (3) the diamond sintered compact as described above in (1), wherein the compound containing an alkaline earth metal, silicon and oxygen is a composite oxide or solid solution consisting of an oxide of an alkaline earth metal and silicon oxide.

In addition, there are provided (4) a process for the production of the diamond sintered compact as described above in any one of (1) to (3), which comprises using a silicate of an alkaline earth metal as a sintering agent, mixing a powder of the silicate with diamond powder, non-diamond carbon powder or mixed powders of diamond and non-diamond carbon, and maintaining and sintering the mixture under pressure and temperature conditions in the thermodynamically stable region of diamond, (5) a process for the production of the diamond sintered compact as described above in any one of (1) to (3), which comprises using a silicate of an alkaline earth metal as a sintering agent, laminating a shaped body of this powder and a shaped body of diamond powder, shaped body of non-diamond carbon powder or shaped body of mixed powders of diamond and non-diamond carbon, and maintaining and sintering the laminate under pressure and temperature conditions in the thermodynamically stable region of diamond, and (6) the process for the production of the diamond sintered compact as described above in (4) or (5), wherein the mixture of an oxide of an alkaline earth metal and silicon oxide is used as the sintering agent in place of the silicate.

In each of these production processes, the sintering agent is added to the raw material powder so that it is present in a proportion of 0.1 to 30 volume % in the composition.

The fifth embodiment of the present invention consists in (1) a diamond sintered compact comprising 0.1 to 30 volume % of a material consisting of a compound containing a rare earth element, silicon and oxygen, and the balance of diamond, in particular, including (2) the diamond sintered compact as described above in (1), wherein the compound containing a rare earth element, silicon and oxygen is a silicate of a rare earth element and (3) the diamond sintered compact as described above in (1), wherein the compound containing a rare earth element, silicon and oxygen is a composite oxide or solid solution consisting of an oxide of a rare earth element and silicon oxide.

In addition, there are provided (4) a process for the production of the diamond sintered compact as described above in any one of (1) to (3), which comprises using a silicate of a rare earth element as a sintering agent, mixing a powder of the silicate with diamond powder, non-diamond carbon powder or mixed powders of diamond and non-diamond carbon, and maintaining and sintering the mixture under pressure and temperature conditions in the thermodynamically stable region of diamond, (5) a process for the production of the diamond sintered compact as described above in any one of (1) to (3), which comprises using a silicate of a rare earth element as a sintering agent, laminating a shaped body of this powder and a shaped body of diamond powder, shaped body of non-diamond carbon powder or shaped body of mixed powders of diamond and non-diamond carbon, and maintaining and sintering the laminate under pressure and temperature conditions in the thermodynamically stable region of diamond, and (6) the process for the production of the diamond sintered compact as described above in (4) or (5), wherein a mixture of an oxide of a rare earth element and silicon oxide is used as the sintering agent in place of the silicate.

In each of these production processes, the sintering agent is added to the raw material powder so that it is present in a proportion of 0.1 to 30 volume % in the composition.

The sixth embodiment of the present invention consists in (1) a diamond sintered compact comprising 0.1 to 30 volume % of a material consisting of a compound containing silicon, titanium and oxygen, and the balance of diamond, in particular, including (2) the diamond sintered compact as described above in (1), wherein the compound containing silicon, titanium and oxygen is a composite oxide or solid solution consisting of silicon oxide and titanium oxide.

In addition, there are provided (3) a process for the production of the diamond sintered compact as described above in (1) or (2), which comprises using a mixture of silicon oxide and titanium oxide, as a sintering agent, mixing a powder of the mixture with diamond powder, non-diamond carbon powder or mixed powders of diamond and non-diamond carbon, and maintaining and sintering the mixture under pressure and temperature conditions in the thermodynamically stable region of diamond, (4) a process for the production of the diamond sintered compact as described above in (1) or (2), which comprises using a mixture of silicon oxide and titanium oxide, laminating a shaped body of this powder and a shaped body of diamond powder, shaped body of non-diamond carbon powder or shaped body of mixed powders of diamond and non-diamond carbon, and maintaining and sintering the laminate under pressure and temperature conditions in the thermodynamically stable region of diamond, (5) the process for the production of the diamond sintered compact as described above in (3) or (4), wherein the mixture of silicon oxide and titanium oxide used as a sintering agent contains the titanium oxide in a proportion of 0.1 to 50 volume % and (6) the process for the production of the diamond sintered compacts as described in above any one of (3) to (5), wherein the silicon oxide contained in the mixture of silicon oxide and titanium oxide used as a sintering agent is silicic acid or silicon oxide hydrate.

In each of these production processes, the sintering agent is added to the raw material powder so that it is present in a proportion of 0.1 to 30 volume % in the composition.

The feature of the present invention consists in a diamond sintered compact comprising 0.1 to 30 volume % of at least one compound containing silicon and/or titanium and oxygen and the balance of diamond, and above all, the first embodiment comprises using, as a sintering agent for the diamond sintered compact, a titanate of a metal selected from the group consisting of iron, cobalt, nickel and manganese or a mixture of an oxide of a metal selected from the group consisting of iron, cobalt, nickel and manganese with titanium oxide.

Up to the present time, no examples have been known using, as an effective sintering agent for the diamond sintered compact, a titanate of a metal selected from the group consisting of iron, cobalt, nickel and manganese or a mixture of an oxide of a metal selected from the group consisting of iron, cobalt, nickel and manganese with titanium oxide. The inventors have now found that a diamond sintered compact having a higher strength as well as more excellent breakage resistance, heat resistance, wear resistance and corrosion resistance, having hitherto not been achieved, can be obtained by using these materials as a sintering agent.

Examples of the titanate of a metal selected from the group consisting of iron, cobalt, nickel and manganese include $FeTiO_3$, $FeTi_2O_5$, $CoTiO_3$, $MnTiO_3$, $NiTiO_3$, etc. These materials are capable of exhibiting a strong catalytic function for diamond and when using them as a sintering agent, there is formed a matrix consisting of diamond grains very strongly bonded with each other. Furthermore, abnormal grain growth hardly takes place to result in a sintered compact with homogeneous structure. Consequently, a diamond sintered compact having a higher strength as well as more excellent breakage resistance and wear resistance, having hitherto not been achieved, can be obtained. Such a sintering agent has preferably a grain diameter range of 0.01 to 10 $\mu$m.

The diamond sintered body obtained in this way has a feature of containing a material consisting of a compound containing a metal selected from the group consisting of iron, cobalt, nickel and manganese, illustrative of which are titanates of iron or cobalt, composite oxides or solid solutions of oxides such as iron oxides and cobalt oxides with titanium oxides. These materials are stable at a high temperature, e.g. about 1300° C. and resistant to acids or alkalies. Accordingly, the diamond sintered compact of the first embodiment of the present invention has very excellent properties for heat resistance and corrosion resistance.

In the diamond sintered compact of the first embodiment of the present invention, the material consisting of a compound containing a metal selected from the group consisting of iron, cobalt, nickel and manganese, titanium and oxygen is present in a proportion of preferably 0.1 to 30 volume %, since if less than 0.1 volume %, the bonding property, i.e. sintering property among diamond grains is degraded, while if more than 30 volume %, the strength and wear resistance are lowered due to the presence of excessive titanium oxide.

As raw materials, there can be used synthetic diamond powders, natural diamond powders, polycrystalline diamond powders, etc. The grain diameter of the powder is generally in a range of 0.01 to 200 $\mu$m and depending upon uses thereof, there are used those whose grain diameters are adjusted to fine or coarse or mixtures of fine grains and coarse grains.

In place of these diamonds, non-diamond carbons such as graphite, glassy carbons, pyrolytic graphites, etc. can be used as the raw material. A mixture of diamond and non-diamond graphite can also be used.

For the production of a diamond sintered compact according to the first embodiment of the present invention, there are processes comprising maintaining a mixture of diamond powder or non-diamond carbon powder with a titanate of iron or cobalt or a mixture of iron oxide or cobalt oxide and titanium oxide under pressure and temperature conditions in the thermodynamically stable region of diamond, and comprising laminating a shaped body of diamond powder or non-diamond graphite powder and a shaped body of a titanate of iron or cobalt or a mixture of iron oxide or cobalt oxide with titanium oxide, maintaining and sintering the laminate under pressure and temperature conditions in the thermodynamically stable region of diamond.

In a method of mixing a raw material with a sintering agent, the raw material and sintering agent are mechanically mixed by dry or wet process and the resulting powder is compressed and molded or charged in a capsule of Mo, etc., followed by sintering at a high pressure and temperature. Even if the raw material powder is of fine grains, the sintering agent can uniformly be dispersed therein and a diamond sintered compact having a thick shape can be produced. For example, this method is suitable for the production of a cutting tool (fine grain sintered compact) needing a well finished surface or a sintered compact needing a thick shape such as dies. In the case of using a raw material of coarse grain, however, it is considerably difficult to uniformly mix a sintering agent.

In a method of laminating and arranging a raw material and sintering agent, on the other hand, plate-shaped bodies of the raw material and sintering agent are respectively prepared, laminated to be contacted with each other and then subjected to a high pressure and high temperature treatment, during which the sintering agent is diffused and impregnated into the raw material layer and diamond grains are sintered. According to this method, the sintering agent can uniformly be added even when using a coarse grain raw material, so a diamond sintered compact with a higher strength and higher wear resistance can stably be obtained and this is suitable for the production of a sintered compact such as wear resistance tools, drill bits, etc.

The second embodiment of the present invention comprises using, as a sintering agent for the diamond sintered compact, a titanate of an alkali metal or alkaline earth metal or a mixture of an oxide of an alkali metal or alkaline earth metal and titanium oxide.

Up to the present time, no examples have been known using, as an effective sintering agent for the diamond sintered compact, a titanate of an alkali metal or alkaline earth metal or a mixture of an oxide of an alkali metal or alkaline earth metal and titanium oxide. The inventors have now found that a diamond sintered compact having a higher strength as well as more excellent breakage resistance, heat resistance, wear resistance and corrosion resistance, having hitherto not been achieved, can be obtained by using, as the sintering agent, a titanate of an alkali metal or alkaline earth metal, or a mixture of an oxide of an alkali metal or alkaline earth metal and titanium oxide.

Examples of the titanate of an alkali metal or alkaline earth metal include $LiTiO_3$, $MgTiO_3$, $CaTiO_3$, $SrTiO_3$, etc. These materials are capable of exhibiting a strong catalytic function for diamond and when using them as a sintering agent, there is formed a matrix consisting of diamond grains very strongly bonded with each other. Furthermore, abnormal grain growth hardly takes place to result in a sintered compact with homogeneous structure. Consequently, a diamond sintered compact having a higher strength as well as more excellent breakage resistance and wear resistance, having hitherto not been achieved, can be obtained. Such a sintering agent has preferably a grain diameter range of 0.01 to 10 $\mu$m.

The diamond sintered body obtained in this way has a feature of containing a material consisting of a compound containing titanium, an alkali metal or alkaline earth metal and oxygen, illustrative of which are titanates of alkali metals or alkaline earth metals, as described above, or composite oxides or solid solutions of alkali metal oxides or alkaline earth metal oxides with titanium oxides. These materials are stable at a high temperature, e.g. about 1500° C. and resistant to acids or alkalies. Accordingly, the diamond sintered compact of the second embodiment of the present invention has very excellent properties for heat resistance and corrosion resistance.

In the diamond sintered compact of the second embodiment of the present invention, the material consisting of a compound containing titanium, an alkali metal or alkaline earth metal and oxygen is present in a proportion of preferably 0.1 to 30 volume %, since if less than 0.1 volume %, the bonding property, i.e. sintering property among diamond grains is degraded, while if more than 30 volume %, the strength and wear resistance are lowered due to the presence of excessive titanium oxide.

As raw materials, there can be used synthetic diamond powders, natural diamond powders, polycrystalline diamond powders, etc. The grain diameter of the powder is generally in a range of 0.01 to 200 $\mu$m and depending upon uses thereof, there are used those whose grain diameters are adjusted to fine or coarse or mixtures of fine grains and coarse grains.

In place of these diamonds, non-diamond carbons such as graphite, glassy carbons, pyrolytic graphites, etc. can be used as the raw material. A mixture of diamond and non-diamond graphite can also be used. For the production of a diamond sintered compact according to the second embodiment of the present invention, there are processes comprising maintaining a mixture of diamond powder or non-diamond carbon powder with a titanate of an alkali metal or alkaline earth metal, or a mixture of an alkali metal oxide or alkaline earth metal oxide and titanium oxide under pressure and temperature conditions in the thermodynamically stable region of diamond; and comprising laminating a shaped body of diamond powder or non-diamond graphite powder and a shaped body of a titanate of an alkali metal or alkaline earth metal or a mixture of alkali metal oxide or alkaline earth metal oxide with titanium oxide, maintaining and sintering the laminate under pressure and temperature conditions in the thermodynamically stable region of diamond.

The method of mixing a raw material with a sintering agent and the method of laminating and arranging a raw material and a sintering agent can be carried out in the similar manner to those in the first embodiment of the present invention with equal benefits thereto.

The third embodiment of the present invention comprises using, as a sintering agent for the diamond sintered compact, a titanate of a rare earth element or a mixture of an oxide of a rare earth element with titanium oxide.

Up to the present time, no examples have been known using, as an effective sintering agent for the diamond sintered compact, a titanate of a rare earth element or a mixture of an oxide of a rare earth element with titanium oxide. The inventors have now found that a diamond sintered compact having a higher strength as well as more excellent breakage resistance, heat resistance, wear resistance and corrosion resistance, having hitherto not been achieved, can be obtained by using, as the sintering agent, a titanate of a rare earth element or a mixture of an oxide of a rare earth element with titanium oxide.

Examples of the titanate of a rare earth element include $M_2TiO_5$ or $M_2Ti_2O_7$ wherein M is a rare earth element. The rare earth element includes scandium (Sc), yttrium (Y), lanthanum (La), cerium (Ce), praseodymium (Pr), neodymium (Nd), prometium (Pm), samarium (Sm), europium (Eu), gadolinium (Gd), terbium (Tb), dysprosium (Dy), holmium (Ho), erbium (Er), thulium (Tm), ytteribium (Yb), and lutetium (Lu).

Examples of the oxide of a rare earth element include $M_2O_3$ or $MO_2$ wherein M is a rare earth element. The titanate of a rare earth element or a mixture of an oxide of a rare earth element and titanium oxide is capable of exhibiting a strong catalytic function for diamond and when using them as a sintering agent, there is formed a matrix consisting of diamond grains very strongly bonded with each other. Furthermore, abnormal grain growth hardly takes place to result in a sintered compact with homogeneous structure. Consequently, a diamond sintered compact having a higher strength as well as more excellent breakage resistance and wear resistance, having hitherto not been achieved, can be obtained.

The diamond sintered body obtained in this way has a feature of containing a material consisting of a compound containing a rare earth element, titanium, and oxygen, illustrative of which are titanates of rare earth elements or composite oxides or solid solutions of oxides of rare earth elements and titanium oxides, as described above. These materials are stable at a high temperature, e.g. about 1300° C. and resistant to acids or alkalies. Accordingly, the diamond sintered compact of the third embodiment of the present invention has very excellent properties for heat resistance and corrosion resistance.

In the diamond sintered compact of the third embodiment of the present invention, the material consisting of a compound containing a rare earth element, titanium and oxygen is present in a proportion of preferably 0.1 to 30 volume %, since if less than 0.1 volume %, the bonding property, i.e. sintering property among diamond grains is degraded, while if more than 30 volume %, the strength and wear resistance are lowered due to the presence of excessive titanium oxide.

As raw materials, there can be used synthetic diamond powders, natural diamond powders, polycrystalline diamond powders, etc. The grain diameter of the powder is generally in a range of 0.01 to 200 μm and depending upon uses thereof, there are used those whose grain diameters are adjusted to fine or coarse or mixtures of fine grains and coarse grains.

In place of these diamonds, non-diamond carbons such as graphite, glassy carbons, pyrolytic graphites, etc. can be used as the raw material. A mixture of diamond and non-diamond graphite can also be used.

For the production of a diamond sintered compact according to the third embodiment of the present invention, there are processes comprising maintaining a mixture of diamond powder or non-diamond carbon powder with a titanate of a rare earth element or a mixture of an oxide of rare earth element and titanium oxide under pressure and temperature conditions in the thermodynamically stable region of diamond; and comprising laminating a shaped body of diamond powder or non-diamond graphite powder and a shaped body of a titanate of a rare earth element or a mixture of an oxide of a rare earth element with titanium oxide, maintaining and sintering the laminate under pressure and temperature conditions in the thermodynamically stable region of diamond.

The method of mixing a raw material with a sintering agent and the method of laminating and arranging a raw material and a sintering agent can be carried out in the similar manner to those in the first embodiment of the present invention with equal benefits thereto.

The fourth embodiment of the present invention comprises using, as a sintering agent for the diamond sintered compact, a silicate of an alkaline earth metal or a mixture of an oxide of an alkaline earth metal and silicon oxide.

Up to the present time, no examples have been known using, as an effective sintering agent for the diamond sintered compact, a silicate of an alkaline earth metal or a mixture of an oxide of an alkaline earth metal and silicon oxide. The inventors have now found that a diamond sintered compact having a higher strength as well as more excellent breakage resistance, heat resistance, wear resistance and corrosion resistance, having hitherto not been achieved, can be obtained by using, as the sintering agent, a silicate of an alkaline earth metal, or a mixture of an oxide of an alkaline earth metal and silicon oxide.

Examples of the silicate of an alkaline earth metal include $MgSiO_3$, $Mg_2SiO_4$, $Mg_2Si_3O_4$, $CaSiO_3$, $Ca_2SiO_4$, $BaSi_2O_5$, $Ba_2Si_3O_8$, etc The silicate of an alkaline earth element or a mixture of an oxide of an alkaline earth with silicon oxide is capable of exhibiting a strong catalytic function for diamond and when using them as a sintering agent, there is formed a matrix consisting of diamond grains very strongly bonded with each other. Furthermore, abnormal grain growth hardly takes place to result in a sintered compact with homogeneous structure. Consequently, a diamond sintered compact having a higher strength as well as more excellent breakage resistance and wear resistance, having hitherto not been achieved, can be obtained.

The diamond sintered body obtained in this way has a feature of containing a material consisting of a compound containing an alkaline earth metal, silicon and oxygen, illustrative of which are silicates of alkaline earth metals, as described above, or composite oxides or solid solutions of alkaline earth metal oxides with silicon oxides. These materials are stable at a high temperature, e.g. about 1300° C. and resistant to acids or alkalies. Accordingly, the diamond sintered compact of the fourth embodiment of the present invention has very excellent properties for heat resistance and corrosion resistance.

In the diamond sintered compact of the fourth embodiment of the present invention, the material consisting of a compound containing an alkaline earth metal, silicon and oxygen is present in a proportion of preferably 0.1 to 30 volume %, since if less than 0.1 volume %, the bonding property, i.e. sintering property among diamond grains is degraded, while if more than 30 volume %, the strength and wear resistance are lowered due to the presence of excessive silicate compound.

As raw materials, there can be used synthetic diamond powders, natural diamond powders, polycrystalline diamond powders, etc. The grain diameter of the powder is generally in a range of 0.01 to 200 μm and depending upon uses thereof, there are used those whose grain diameters are adjusted to fine or coarse or mixtures of fine grains and coarse grains.

In place of these diamonds, non-diamond carbons such as graphite, glassy carbons, pyrolytic graphites, etc. can be used as the raw material. A mixture of diamond and non-diamond graphite can also be used.

For the production of a diamond sintered compact according to the fourth embodiment of the present invention, there are processes comprising maintaining a mixture of diamond powder or non-diamond carbon powder with a silicate of an alkaline earth metal or a mixture of an alkaline earth metal oxide and silicon oxide under pressure and temperature conditions in the thermodynamically stable region of diamond; and comprising laminating a shaped body of diamond powder or non-diamond graphite powder and a shaped body of a silicate of an alkaline earth metal or a mixture of alkaline earth metal oxide with silicon oxide, maintaining and sintering the laminate under pressure and temperature conditions in the thermodynamically stable region of diamond.

The method of mixing a raw material with a sintering agent and the method of laminating and arranging a raw material and a sintering agent can be carried out in the similar manner to those in the first embodiment of the present invention with equal benefits thereto.

The fifth embodiment of the present invention comprises using, as a sintering agent for the diamond sintered compact, a silicate of a rare earth element or a mixture of an oxide of a rare earth element and silicon oxide.

Up to the present time, no examples have been known using, as an effective sintering agent for the diamond sintered compact, a silicate of a rare earth element or a mixture of an oxide of a rare earth element and silicon oxide. The inventors have now found that a diamond sintered compact having a higher strength as well as more excellent breakage resistance, heat resistance, wear resistance and corrosion resistance, having hitherto not been achieved, can be obtained by using, as the sintering agent, a silicate of a rare earth element or a mixture of an oxide of a rare earth element and silicon oxide, and thus have reached the present invention.

Examples of the silicate of a rare earth element include, for example, $M_2SiO_5$ or $M_2Si_2O_7$ wherein M is a rare earth element. The rare earth element includes scandium (Sc), yttrium (Y), lanthanum (La), cerium (Ce), praseodymium (Pr), neodymium (Nd), prometium (Pm), samarium (Sm), europium (Eu), gadolinium (Gd), terbium (Tb), dysprosium (Dy), holmium (Ho), erbium (Er), thulium (Tm), ytteribium (Yb) and lutetium (Lu).

Examples of the oxide of a rare earth element include $M_2O_3$ or $MO_2$ wherein M is a rare earth element. The silicate of a rare earth element or a mixture of an oxide of a rare earth element and silicon oxide is capable of exhibiting a strong catalytic function for diamond and when using them as a sintering agent, there is formed a matrix consisting of diamond grains very strongly bonded with each other. Furthermore, abnormal grain growth hardly takes place to result in a sintered compact with homogeneous structure. Consequently, a diamond sintered compact having a higher strength as well as more excellent breakage resistance and wear resistance, having hitherto not been achieved, can be obtained.

The diamond sintered body obtained in this way has a feature of containing a material consisting of a compound containing a rare earth element, silicon and oxygen, illustrative of which are silicates of rare earth elements, as described above, or composite oxides or solid solutions of rare earth element oxides with silicon oxide. These materials are stable at a high temperature, e.g. about 1400° C. and resistant to acids or alkalies. Accordingly, the diamond sintered compact of the fifth embodiment of the present invention has very excellent properties for heat resistance and corrosion resistance.

In the diamond sintered compact of the fifth embodiment of the present invention, the material consisting of a compound containing a rare earth element, silicon and oxygen is present in a proportion of preferably 0.1 to 30 volume %, since if less than 0.1 volume %, the bonding property, i.e. sintering property among diamond grains is degraded, while if more than 30 volume %, the strength and wear resistance are lowered due to the presence of excessive silicate compound.

As raw materials, there can be used synthetic diamond powders, natural diamond powders, polycrystalline diamond powders, etc. The grain diameter of the powder is generally in a range of 0.01 to 200 $\mu$m and depending upon uses thereof, there are used those whose grain diameters are adjusted to fine or coarse or mixtures of fine grains and coarse grains.

In place of these diamonds, non-diamond carbons such as graphite, glassy carbons, pyrolytic graphites, etc. can be used as the raw material. A mixture of diamond and non-diamond graphite can also be used.

For the production of a diamond sintered compact according to the fifth embodiment of the present invention, there are processes comprising maintaining a mixture of diamond powder or non-diamond carbon powder with a silicate of a rare earth element or a mixture of an oxide of a rare earth element and silicon oxide under pressure and temperature conditions in the thermodynamically stable region of diamond; and comprising laminating a shaped body of diamond powder or non-diamond graphite powder and a shaped body of a silicate of a rare earth element or a mixture of an oxide of a rare earth element with silicon oxide, maintaining and sintering the laminate under pressure and temperature conditions in the thermodynamically stable region of diamond.

The method of mixing a raw material with a sintering agent and the method of laminating and arranging a raw material and a sintering agent can be carried out in the similar manner to those in the first embodiment of the present invention with equal benefits thereto.

The sixth embodiment of the present invention comprises using, as a sintering agent for the diamond sintered compact, a mixture of silicon oxide ($SiO_2$) and titanium oxide ($TiO_2$). In place of the silicon oxide, there can be used silicic acids such as $H_4SiO_4$, $H_2SiO_3$, $H_2Si_2O_2$, etc. and hydrates thereof such as $SiO_2 \cdot nH_2O$.

Up to the present time, no examples have been known using, as an effective sintering agent for the diamond sintered compact, a mixture of silicon oxide or silicic acid with titanium oxide. The inventors have now found that a diamond sintered compact having a higher strength as well as more excellent breakage resistance, heat resistance, wear resistance and corrosion resistance, having hitherto not been achieved, can be obtained by using, as the sintering agent, a mixture of silicon oxide or silicic acid with titanium oxide, and thus have reached the present invention.

A mixture of silicon oxide or silicic acid and titanium oxide is capable of exhibiting a strong catalytic function for diamond and when using it as a sintering agent, there is formed a matrix consisting of diamond grains very strongly bonded with each other. Furthermore, abnormal grain growth hardly takes place to result in a sintered compact with homogeneous structure. Consequently, a diamond sintered compact having a higher strength as well as more excellent breakage resistance and wear resistance, having hitherto not been achieved, can be obtained.

The diamond sintered body obtained in this way has a feature of containing a material consisting of a compound containing silicon, titanium and oxygen, illustrative of which are composite oxides or solid solutions of silicon oxide and titanium oxide. These materials are stable at a high temperature, e.g. about 1500° C. and resistant to acids or alkalies. Accordingly, the diamond sintered compact of the sixth embodiment of the present invention has very excellent properties for heat resistance and corrosion resistance.

In the diamond sintered compact of the sixth embodiment of the present invention, the material consisting of a compound containing silicon, titanium and oxygen is present in a proportion of preferably 0.1 to 30 volume %, since if less than 0.1 volume %, the bonding property, i.e. sintering property among diamond grains is degraded, while if more than 30 volume %, the strength and wear resistance are lowered due to the presence of the compound in an excessive amount.

As raw materials, there can be used synthetic diamond powders, natural diamond powders, polycrystalline diamond powders, etc. The grain diameter of the powder is generally in a range of 0.01 to 200 $\mu$m and depending upon uses thereof, there are used those whose grain diameters are adjusted to fine or coarse ones or mixtures of fine grains and coarse grains.

In place of these diamonds, non-diamond carbons such as graphite, glassy carbons, pyrolytic graphites, etc. can be used as the raw material. A mixture of diamond and non-diamond graphite can also be used.

For the production of a diamond sintered compact according to the sixth embodiment of the present invention, there are processes comprising maintaining a mixture of diamond powder or non-diamond carbon powder with silicon oxide and titanium oxide under pressure and temperature conditions in the thermodynamically stable region of diamond; and comprising laminating a shaped body of diamond powder or non-diamond graphite powder and a shaped body of a mixture of silicon oxide and titanium oxide, maintaining and sintering the laminate, as a raw material, under pressure and temperature conditions in the thermodynamically stable region of diamond.

In this embodiment, the mixture of silicon and titanium oxide preferably contains titanium oxide in a proportion by volume of 0.1 to 50%. When the proportion of titanium oxide is less than 0.1% or more than 50%, the sintering is insufficient and in order to obtain a tenacious sintered compact, very high sintering temperature and pressure conditions, e.g. at least 250° C. and at least 8 GPa are required and production of diamond on a commercial scale is difficult. Moreover, when using silicon oxide alone or titanium oxide alone as a sintering agent, severer pressure and temperature conditions are further required.

In place of the silicon oxide, silicic acids or silicon hydrates can be used. In this case, a tenacious sintered compact can be obtained even if the sintering temperature somewhat is low.

The method of mixing a raw material with a sintering agent and the method of laminating and arranging a raw material and a sintering agent can be carried out in the similar manner to those in the first embodiment of the present invention with the equal benefits thereto.

The present invention will now be illustrated in detail by the following Examples without limiting the same.

(Example 1)

FeTiO$_3$ was used as a sintering agent. A synthetic diamond powder with an average grain diameter of 3.5 $\mu$m and FeTiO$_3$ powder with a grain diameter of 1~2 $\mu$m were respectively and adequately mixed in a proportion of 95 volume % and 5 volume %, charged in a Mo capsule, and maintained and sintered at pressure and temperature conditions of 7.5 GPa and 2000° C. for 15 minutes using an ultra-high pressure and high temperature producing apparatus of Belt type. The resulting diamond sintered compact was subjected to identification of the composition by X-ray diffraction to detect about 5 volume % of FeTiO$_3$ in addition to diamond.

When the hardness of the sintered compact was estimated by a Knoop indenter, such a high hardness was given as represented by 7800 kg/mm$^2$. When the resulting sintered compact and commercially available Co-binder compact were compared as to the fracture toughness by the indentation method, the former gave a relative toughness of about 1.4 times as large as that of the prior art compact (the latter). When the resulting sintered compact was heat-treated in vacuum at 1200° C. and then subjected to measurement of the hardness and toughness, there was found little change from before the heat treatment. In addition, there was no deterioration of the sintered compact by a treatment with an acid.

(Example 2)

Example 1 was repeated except using 5 volume % of CoTiO$_3$ as a sintering agent to prepare a diamond sintered compact. The thus obtained sintered compact contained CoTiO$_3$ and had a similar hardness, toughness and heat resistance to those of Example 1.

(Example 3)

Example 1 was repeated except using 5 volume % of NiTiO$_3$ as a sintering agent to prepare a diamond sintered compact. The thus obtained sintered compact contained NiTiO$_3$ and had a similar hardness, toughness and heat resistance to those of Example 1.

(Example 4)

Example 1 was repeated except using 5 volume % of MnTiO$_3$ as a sintering agent to prepare a diamond sintered compact. The thus obtained sintered compact contained MnTiO$_2$ and had a similar hardness, toughness and heat resistance to those of Example 1.

(Example 5)

Example 1 was repeated except using a mixture of FeO and TiO$_2$ in a volume ratio of 1:1 as a sintering agent to prepare a diamond sintered compact. The thus obtained sintered compact contained FeTiO$_3$ and had a similar hardness, toughness and heat resistance to those of Example 1.

(Example 6)

Example 1 was repeated except using a mixture of CoO and TiO$_2$ in a volume ratio of 1:1 as a sintering agent to prepare a diamond sintered compact. The thus obtained sintered compact contained CoTiO$_3$ and had a similar hardness, toughness and heat resistance to those of Example 1.

(Example 7)

FeTiO$_3$ was used as a sintering agent. A synthetic diamond powder with an average grain diameter of 15 $\mu$m and FeTiO$_3$ powder with a grain diameter of 1~2 $\mu$m were respectively shaped in plates with a thickness of 2 mm and 1 mm, alternately laminated, charged in a Mo capsule, and maintained and sintered at pressure and temperature conditions of 7.5 GPa and 2000° C. for 15 minutes using an ultra-high pressure and high temperature producing apparatus of Belt type. The resulting diamond sintered compact was subjected to identification of the composition by X-ray diffraction to detect about 2 volume % of FeTiO$_3$ in addition to diamond.

When the hardness of the sintered compact was estimated by a Knoop indenter, such a high hardness was given as represented by about 8000 kg/mm². When the resulting sintered compact and commercially available Co-binder compact were compared as to the fracture toughness by the indentation method, the former gave a relative toughness of about 1.4 times as large as that of the prior art compact (the latter). When the resulting sintered compact was heat-treated in vacuum at 1200° C. and then subjected to measurement of the hardness and toughness, there was found little change from before the heat treatment. In addition, there was no deterioration of the sintered compact by a treatment with an acid.

(Example 8)

FeTiO$_3$ was used as a sintering agent. A plate-shaped sintered compact of a high purity isotropic graphite with an average grain diameter of 3 μm, having a thickness of 2 mm, and a molded and shaped body of FeTiO$_3$ powder with a grain diameter of 1 to 2 μm, having a thickness of 1 mm, were alternately laminated, charged in a Mo capsule, and maintained and sintered at pressure and temperature conditions of 7.5 GPa and 2000° C. for 15 minutes using an ultra-high pressure and high temperature producing apparatus of Girdle type. The resulting diamond sintered compact was subjected to identification of the composition by X-ray diffraction to detect about 3 volume % of FeTiO$_3$ in addition to diamond.

When the hardness of the sintered compact was estimated by a Knoop indenter, such a high hardness was given as represented by about 7800 kg/mm². When the resulting sintered compact and commercially available Co-binder compact were compared as to the fracture toughness by the indentation method, the former gave a relative toughness of about 1.3 times as large as that of the prior art compact (the latter). When the resulting sintered compact was heat-treated in vacuum at 1200° C. and then subjected to measurement of the hardness and toughness, there was found little change from before the heat treatment. In addition, there was no deterioration of the sintered compact by a treatment with an acid.

(Comparative Example 1)

FeTiO$_3$ was used as a sintering agent. Example 1 was repeated except adding a micro amount (about 0.05 volume %) of FeTiO$_3$ powder with a grain diameter of 1 to 2 μm to a synthetic diamond powder with an average grain diameter of 3.5 μm and adequately mixing them to prepare a raw material, thus obtaining a diamond sintered compact therefrom. However, the thus obtained sintered compact contained more non-sintered parts.

(Comparative Example 2)

FeTiO$_3$ was used as a sintering agent. Example 1 was repeated except adding 60 volume % of a synthetic diamond powder with an average grain diameter of 3.5 μm and 40 volume % of FeTiO$_3$ powder with a grain diameter of 1 to 2 μm and adequately mixing them to prepare a raw material, thus obtaining a diamond sintered compact therefrom. In the thus obtained sintered compact, however, the grains were not sufficiently bonded with each other to give a low hardness, i.e. about 3500 kg/mm².

(Example 9)

CaTiO$_3$ was used as a sintering agent. A synthetic diamond powder with an average grain diameter of 3.5 μm and CaTiO$_3$ powder with a grain diameter of 1~2 μm were respectively and adequately mixed in a proportion of 95 volume % and 5 volume %, charged in a Mo capsule, and maintained and sintered at pressure and temperature conditions of 7.5 GPa and 2000° C. for 15 minutes using an ultra-high pressure and high temperature producing apparatus of Belt type. The resulting diamond sintered compact was subjected to identification of the composition by X-ray diffraction to detect about 5 volume % of CaTiO$_3$ in addition to diamond.

When the hardness of the sintered compact was estimated by a Knoop indentor, such a high hardness was given as represented by 7800 kg/mm². When the resulting sintered compact and commercially available Co-binder compact were compared as to the fracture toughness by the indentation method, the former gave a relative toughness of about 1.4 times as large as that of the prior art compact (the latter). When the resulting sintered compact was heat-treated in vacuum at 1300° C. and then subjected to measurement of the hardness and toughness, there was found little change from before the heat treatment. In addition, there was no deterioration of the sintered compact by a treatment with an acid.

(Example 10)

Example 9 was repeated except using 5 volume % of MgTiO$_3$ as a sintering agent to prepare a diamond sintered compact. The thus obtained sintered compact contained MgTiO$_3$ and had a similar hardness, toughness and heat resistance to those of Example 9.

(Example 11)

Example 9 was repeated except using 5 volume % of SrTiO$_3$ as a sintering agent to prepare a diamond sintered compact. The thus obtained sintered compact contained SrTiO$_3$ and had a similar hardness, toughness and heat resistance to those of Example 9.

(Example 12)

Example 9 was repeated except using 5 volume % of LiTiO$_3$ as a sintering agent to prepare a diamond sintered compact. The thus obtained sintered compact contained LiTiO$_3$ and had a similar hardness, toughness and heat resistance to those of Example 9.

(Example 13)

Example 9 was repeated except using a mixture of CaO and TiO$_2$ in a volume ratio of 1:1 as a sintering agent to prepare a diamond sintered compact. The thus obtained sintered compact contained CaTiO$_3$ and had a similar hardness, toughness and heat resistance to those of Example 9.

(Example 14)

Example 9 was repeated except using a mixture of MgO and TiO$_2$ in a volume ratio of 1:1 as a sintering agent to prepare a diamond sintered compact. The thus obtained sintered compact contained MgTiO$_3$ and had a similar hardness, toughness and heat resistance to those of Example 9.

(Example 15)

CaTiO$_3$ was used as a sintering agent. A synthetic diamond powder with an average grain diameter of 15 μm and CaTiO$_3$ powder with a grain diameter of 1~2 μm were respectively shaped in plates with a thickness of 2 mm and 1 mm, alternately laminated, charged in a Mo capsule, and maintained and sintered at pressure and temperature conditions of 7.5 GPa and 2000° C. for 15 minutes using an ultra-high pressure and high temperature producing apparatus of Belt type. The resulting diamond sintered compact was subjected to identification of the composition by X-ray diffraction to detect about 2 volume % of CaTiO$_3$ in addition to diamond.

When the hardness of the sintered compact was estimated by a Knoop indenter, such a high hardness was given as represented by about 8100 kg/mm². When the resulting sintered compact and commercially available Co-binder compact were compared as to the fracture toughness by the indentation method, the former gave a relative toughness of about 1.5 times as large as that of the prior art compact (the latter). When the resulting sintered compact was heat-treated in vacuum at 1300° C. and then subjected to measurement of the hardness and toughness, there was found little change from before the heat treatment. In addition, there was no deterioration of the sintered compact by a treatment with an acid.

(Example 16)

$CaTiO_3$ was used as a sintering agent. A plate-shaped sintered compact of a high purity isotropic graphite with an average grain diameter of 3 μm, having a thickness of 2 mm, and a molded and shaped body of $CaTiO_3$ powder with a grain diameter of 1 to 2 μm, having a thickness of 1 mm, were alternately laminated, charged in a Mo capsule, and maintained and sintered at pressure and temperature conditions of 7.5 GPa and 2000° C. for 15 minutes using an ultra-high pressure and high temperature producing apparatus of Girdle type. The resulting diamond sintered compact was subjected to identification of the composition by X-ray diffraction to detect about 3 volume % of $CaTiO_3$ in addition to diamond.

When the hardness of the sintered compact was estimated by a Knoop indenter, such a high hardness was given as represented by about 7800 kg/mm². When the resulting sintered compact and commercially available Co-binder compact were compared as to the fracture toughness by the indentation method, the former gave a relative toughness of about 1.3 times as large as that of the prior art compact (the latter). When the resulting sintered compact was heat-treated in vacuum at 1300° C. and then subjected to measurement of the hardness and toughness, there was found little change from before the heat treatment. In addition, there was no deterioration of the sintered compact by a treatment with an acid.

(Comparative Example 3)

$CaTiO_3$ was used as a sintering agent. Example 9 was repeated except adding a micro amount (about 0.05 volume %) of $CaTiO_3$ powder with a grain diameter of 1 to 2 μm to a synthetic diamond powder with an average grain diameter of 3.5 μm and adequately mixing them to prepare a raw material, thus obtaining a diamond sintered compact therefrom. However, the thus obtained sintered compact contained more non-sintered parts.

(Comparative Example 4)

$CaTiO_3$ was used as a sintering agent. Example 9 was repeated except adding 60 volume % of a synthetic diamond powder with an average grain diameter of 3.5 μm and 40 volume % of $CaTiO_3$ powder with a grain diameter of 1 to 2 μm and adequately mixing them to prepare a raw material, thus obtaining a diamond sintered compact therefrom. In the thus obtained sintered compact, however, the grains were not sufficiently bonded with each other to give a low hardness, i.e. about 3500 kg/mm².

(Example 17)

$Y_2TiO_5$ was used as a sintering agent. A synthetic diamond powder with an average grain diameter of 3.5 μm and $Y_2TiO_5$ powder with a grain diameter of 1~2 μm were respectively and adequately mixed in a proportion of 95 volume % and 5 volume %, charged in a Mo capsule, and maintained and sintered at pressure and temperature conditions of 7.5 GPa and 2000° C. for 15 minutes using an ultra-high pressure and high temperature producing apparatus of Belt type. The resulting diamond sintered compact was subjected to identification of the composition by X-ray diffraction to detect about 5 volume % of $Y_2TiO_5$ in addition to diamond.

When the hardness of the sintered compact was estimated by a Knoop indentor, such a high hardness was given as represented by 7800 kg/mm². When the resulting sintered compact and commercially available Co-binder compact were compared as to the fracture toughness by the indentation method, the former gave a relative toughness of about 1.4 times as large as that of the prior art compact (the latter). When the resulting sintered compact was heat-treated in vacuum at 1200° C. and then subjected to measurement of the hardness and toughness, there was found little change from before the heat treatment. In addition, there was no deterioration of the sintered compact by a treatment with an acid.

(Example 18)

Example 17 was repeated except using 5 volume % of $La_2Ti_2O_7$ as a sintering agent to prepare a diamond sintered compact. The thus obtained sintered compact contained $La_2Ti_2O_7$ and had a similar hardness, toughness and heat resistance to those of Example 17.

(Example 19)

Example 17 was repeated except using 5 volume % of $Ce_2TiO_5$ as a sintering agent to prepare a diamond sintered compact. The thus obtained sintered compact contained $Ce_2TiO_5$ and had a similar hardness, toughness and heat resistance to those of Example 17.

(Example 20)

Example 17 was repeated except using a mixture of $Y_2O_3$ and $TiO_2$ in a volume ratio of 1:1 as a sintering agent to prepare a diamond sintered compact. The thus obtained sintered compact contained a composite oxide of $Y_2O_3$ and $TiO_2$ and had a similar hardness, toughness and heat resistance to those of Example 17.

(Example 21)

Example 17 was repeated except using a mixture of $CeO_2$ and $TiO_2$ in a volume ratio of 1:1 as a sintering agent to prepare a diamond sintered compact. The thus obtained sintered compact contained a composite oxide of $CeO_2$ and $TiO_2$ and had a similar hardness, toughness and heat resistance to those of Example 17.

(Example 22)

Example 17 was repeated except using a mixture of $La_2O_3$ and $TiO_2$ in a volume ratio of 1:2 as a sintering agent to prepare a diamond sintered compact. The thus obtained sintered compact contained a composite oxide of $La_2O_3$ and $TiO_2$ and had a similar hardness, toughness and heat resistance to those of Example 17.

(Example 23)

$Y_2Ti_5$ was used as a sintering agent. A synthetic diamond powder with an average grain diameter of 15 μm and $Y_2TiO_5$ powder with a grain diameter of 1~2 μm were respectively shaped in plates with a thickness of 2 mm and 1 mm, alternately laminated, charged in a Mo capsule, and maintained and sintered at pressure and temperature conditions of 7.5 GPa and 2000° C. for 15 minutes using an ultra-high pressure and high temperature producing apparatus of Belt type. The resulting diamond sintered compact was subjected to identification of the composition by X-ray diffraction to detect about 2 volume % of $Y2TiO_5$ in addition to diamond.

When the hardness of the sintered compact was estimated by a Knoop indenter, such a high hardness was given as represented by about 8000 kg/mm². When the resulting sintered compact and commercially available Co-binder compact were compared as to the fracture toughness by the indentation method, the former gave a relative toughness of about 1.4 times as large as that of the prior art compact (the latter). When the resulting sintered compact was heat-treated in vacuum at 1200° C. and then subjected to measurement of the hardness and toughness, there was found little change from before the heat treatment. In addition, there was no deterioration of the sintered compact by a treatment with an acid.

(Example 24)

Example 23 was repeated except using a mixture of $CeO_2$ and $TiO_2$ in a volume ratio of 1:1 as a sintering agent to prepare a diamond sintered compact. The thus obtained sintered compact contained a composite oxide of $CeO_2$ and $TiO_2$ and had a similar hardness, toughness and heat resistance to those of Example 23.

(Example 25)

$Y_2TiO_5$ was used as a sintering agent. A plate-shaped sintered compact of a high purity isotropic graphite with an average grain diameter of 3 $\mu$m, having a thickness of 2 mm, and a molded and shaped body of $Y_2TiO_5$ powder with a grain diameter of 1 to 2 $\mu$m, having a thickness of 1 mm, were alternately laminated, charged in a Mo capsule, and maintained and sintered at pressure and temperature conditions of 7.5 GPa and 2000° C. for 15 minutes using an ultra-high pressure and high temperature producing apparatus of Belt type. The resulting diamond sintered compact was subjected to identification of the composition by X-ray diffraction to detect about 3 volume % of $Y_2TiO_5$ in addition to diamond.

When the hardness of the sintered compact was estimated by a Knoop indenter, such a high hardness was given as represented by about 7800 kg/mm². When the resulting sintered compact and commercially available Co-binder compact were compared as to the fracture toughness by the indentation method, the former gave a relative toughness of about 1.3 times as large as that of the prior art compact (the latter). When the resulting sintered compact was heat-treated in vacuum at 1200° C. and then subjected to measurement of the hardness and toughness, there was found little change from before the heat treatment. In addition, there was no deterioration of the sintered compact by a treatment with an acid.

(Comparative Example 5)

$Y_2TiO_5$ was used as a sintering agent. Example 17 was repeated except adding a micro amount (about 0.05 volume %) of $Y_2TiO_5$ powder with a grain diameter of 1 to 2 $\mu$m to a synthetic diamond powder with an average grain diameter of 3.5 $\mu$m and adequately mixing them to prepare a raw material, thus obtaining a diamond sintered compact therefrom. However, the thus obtained sintered compact contained more non-sintered parts.

(Comparative Example 6)

$Y_2TiO_5$ was used as a sintering agent. Example 17 was repeated except adding 60 volume % of a synthetic diamond powder with an average grain diameter of 3.5 $\mu$m and 40 volume % of $Y_2TiO_5$ powder with a grain diameter of 1 to 2 $\mu$m and adequately mixing them to prepare a raw material, thus obtaining a diamond sintered compact therefrom. In the thus obtained sintered compact, however, the grains were not sufficiently bonded with each other to give a low hardness, i.e. about 3500 kg/mm².

(Example 26)

$CaSiO_3$ was used as a sintering agent. A synthetic diamond powder with an average grain diameter of 3.5 $\mu$m and $CaSiO_3$ powder with a grain diameter of 1~2 $\mu$m were respectively and adequately mixed in a proportion of 95 volume % and 5 volume %, charged in a Mo capsule, and maintained and sintered at pressure and temperature conditions of 7.5 GPa and 2000° C. for 15 minutes using an ultra-high pressure and high temperature producing apparatus of Belt type. The resulting diamond sintered compact was subjected to identification of the composition by X-ray diffraction to detect about 5 volume % of $CaSiO_3$ in addition to diamond.

When the hardness of the sintered compact was estimated by a Knoop indenter, such a high hardness was given as represented by 7600 kg/mm². When the resulting sintered compact and commercially available Co-binder compact were compared as to the fracture toughness by the indentation method, the former gave a relative toughness of about 1.4 times as large as that of the prior art compact (the latter). When the resulting sintered compact was heat-treated in vacuum at 1200° C. and then subjected to measurement of the hardness and toughness, there was found little change from before the heat treatment. In addition, there was no deterioration of the sintered compact by a treatment with an acid.

(Example 27)

Example 26 was repeated except using 5 volume % of $Mg_2Si_3O_8$ as a sintering agent to prepare a diamond sintered compact. The thus obtained sintered compact contained $Mg2Si_3O$ and had a similar hardness, toughness and heat resistance to those of Example 26.

(Example 28)

Example 26 was repeated except using 5 volume % of $BaSiO_3$ as a sintering agent to prepare a diamond sintered compact. The thus obtained sintered compact contained $BaSiO_3$ and had a similar hardness, toughness and heat resistance to those of Example 26.

(Example 29)

Example 26 was repeated except using a mixture of CaO and $SiO_2$ in a volume ratio of 1:1 as a sintering agent to prepare a diamond sintered compact. The thus obtained sintered compact contained a composite oxide of CaO and $SiO_2$ and had a similar hardness, toughness and heat resistance to those of Example 26.

(Example 30)

Example 26 was repeated except using a mixture of MgO and $SiO_2$ in a volume ratio of 2:3 as a sintering agent to prepare a diamond sintered compact. The thus obtained sintered compact contained a composite oxide of MgO and $SiO_2$ and had a similar hardness, toughness and heat resistance to those of Example 26.

(Example 31)

$CaSiO_3$ was used as a sintering agent. A synthetic diamond powder with an average grain diameter of 15 $\mu$m and $CaSiO_3$ powder with a grain diameter of 1~2 $\mu$m were respectively shaped in plates with a thickness of 2 mm and 1 mm, alternately laminated, charged in a Mo capsule, and maintained and sintered at pressure and temperature conditions of 7.5 GPa and 2000° C. for 15 minutes using an ultra-high pressure and high temperature producing apparatus of Belt type. The resulting diamond sintered compact was subjected to identification of the composition by X-ray diffraction to detect about 2 volume % of $CaSiO_3$ in addition to diamond.

When the hardness of the sintered compact was estimated by a Knoop indenter, such a high hardness was given as represented by about 7800 kg/mm². When the resulting sintered compact and commercially available Co-binder compact were compared as to the fracture toughness by the indentation method, the former gave a relative toughness of about 1.5 times as large as that of the prior art compact (the latter). When the resulting sintered compact was heat-treated in vacuum at 1200° C. and then subjected to measurement of the hardness and toughness, there was found little change from before the heat treatment. In addition, there was no deterioration of the sintered compact by a treatment with an acid.

(Example 32)

Example 31 was repeated except using a mixture of CaO and $SiO_2$, each having a grain diameter of 1 to 2 μm, in a volume ratio of 1:1 as a sintering agent to prepare a diamond sintered compact. The thus obtained sintered compact contained a composite oxide of CaO and $SiO_2$ and had a similar hardness, toughness and heat resistance to those of Example 31.

(Example 33)

$CaSiO_3$ was used as a sintering agent. A plate-shaped sintered compact of a high purity isotropic graphite with an average grain diameter of 3 μm, having a thickness of 2 mm, and a molded and shaped body of $CaSiO_3$ powder with a grain diameter of 1 to 2 μm, having a thickness of 1 mm, were alternately laminated, charged in a Mo capsule, and maintained and sintered at pressure and temperature conditions of 7.5 GPa and 2000° C. for 15 minutes using an ultra-high pressure and high temperature producing apparatus of Belt type. The resulting diamond sintered compact was subjected to identification of the composition by X-ray diffraction to detect about 3 volume % of $CaSiO_3$ in addition to diamond.

When the hardness of the sintered compact was estimated by a Knoop indenter, such a high hardness was given as represented by about 7500 kg/mm$^2$. When the resulting sintered compact and commercially available Co-binder compact were compared as to the fracture toughness by the indentation method, the former gave a relative toughness of about 1.3 times as large as that of the prior art compact (the latter). When the resulting sintered compact was heat-treated in vacuum at 1200° C. and then subjected to measurement of the hardness and toughness, there was found little change from before the heat treatment. In addition, there was no deterioration of the sintered compact by a treatment with an acid.

(Comparative Example 7)

$CaSiO_3$ was used as a sintering agent. Example 26 was repeated except adding a micro amount (about 0.05 volume %) of $CaSiO_3$ powder with a grain diameter of 1 to 2 μm to a synthetic diamond powder with an average grain diameter of 3.5 μm and adequately mixing them to prepare a raw material, thus obtaining a diamond sintered compact therefrom. However, the thus obtained sintered compact contained more non-sintered parts.

(Comparative Example 8)

$CaSiO_3$ was used as a sintering agent. Example 26 was repeated except adding 60 volume % of a synthetic diamond powder with an average grain diameter of 3.5 μm and 40 volume % of $CaSiO_3$ powder with a grain diameter of 1 to 2 m and adequately mixing them to prepare a raw material, thus obtaining a diamond sintered compact therefrom. In the thus obtained sintered compact, however, the grains were not sufficiently bonded with each other to give a low hardness, i.e. about 3500 kg/mm$^2$.

(Example 34)

$Y_2SiO_5$ was used as a sintering agent. A synthetic diamond powder with an average grain diameter of 3.5 μm and $Y_2SiO_5$ powder with a grain diameter of 1~2 μm were respectively and adequately mixed in a proportion of 95 volume % and 5 volume %, charged in a Mo capsule, and maintained and sintered at pressure and temperature conditions of 7.5 GPa and 2000° C. for 15 minutes using an ultra-high pressure and high temperature producing apparatus of Belt type. The resulting diamond sintered compact was subjected to identification of the composition by X-ray diffraction to detect about 5 volume % of $Y_2SiO_5$ in addition to diamond.

When the hardness of the sintered compact was estimated by a Knoop indenter, such a high hardness was given as represented by 7200 kg/mm$^2$. When the resulting sintered compact and commercially available Co-binder compact were compared as to the fracture toughness by the indentation method, the former gave a relative toughness of about 1.3 times as large as that of the prior art compact (the latter). When the resulting sintered compact was heat-treated in vacuum at 1200° C. and then subjected to measurement of the hardness and toughness, there was found little change from before the heat treatment. In addition, there was no deterioration of the sintered compact by a treatment with an acid.

(Example 35)

Example 34 was repeated except using 5 volume % of $La_2Si_2O_7$ as a sintering agent to prepare a diamond sintered compact. The thus obtained sintered compact contained $La2Si_2O7$ and had a similar hardness, toughness and heat resistance to those of Example 34.

(Example 36)

Example 34 was repeated except using 5 volume % of $Ce_2SiO_5$ as a sintering agent to prepare a diamond sintered compact. The thus obtained sintered compact contained $Ce_2SiO5$ and had a similar hardness, toughness and heat resistance to those of Example 34.

(Example 37)

Example 34 was repeated except using a mixture of $Y_2O_3$ and $SiO_2$ in a volume ratio of 1:1 as a sintering agent to prepare a diamond sintered compact. The thus obtained sintered compact contained a composite oxide of $Y_2O_3$ and $SiO_2$ and had a similar hardness, toughness and heat resistance to those of Example 34.

(Example 38)

Example 34 was repeated except using a mixture of $CeO_2$ and $SiO_2$ in a volume ratio of 1:1 as a sintering agent to prepare a diamond sintered compact. The thus obtained sintered compact contained a composite oxide of $CeO_2$ and $SiO_2$ and had a similar hardness, toughness and heat resistance to those of Example 34.

(Example 39)

Example 34 was repeated except using a mixture of $La_2O_3$ and $SiO_2$ in a volume ratio of 1:2 as a sintering agent to prepare a diamond sintered compact. The thus obtained sintered compact contained a composite oxide of $La_2O_3$ and $SiO_2$ and had a similar hardness, toughness and heat resistance to those of Example 34.

(Example 40)

$Y_2SiO_5$ was used as a sintering agent. A synthetic diamond powder with an average grain diameter of 15 μm and $Y_2SiO_5$ powder with a grain diameter of 1~2 μm were respectively shaped in plates with a thickness of 2 mm and 1 mm, alternately laminated, charged in a Mo capsule, and maintained and sintered at pressure and temperature conditions of 7.5 GPa and 2000° C. for 15 minutes using an ultra-high pressure and high temperature producing apparatus of Belt type. The resulting diamond sintered compact was subjected to identification of the composition by X-ray diffraction to detect about 2 volume % of $Y_2SiO_5$ in addition to diamond.

When the hardness of the sintered compact was estimated by a Knoop indenter, such a high hardness was given as represented by about 7600 kg/mm². When the resulting sintered compact and commercially available Co-binder compact were compared as to the fracture toughness by the indentation method, the former gave a relative toughness of about 1.4 times as large as that of the prior art compact (the latter). When the resulting sintered compact was heat-treated in vacuum at 1200° C. and then subjected to measurement of the hardness and toughness, there was found little change from before the heat treatment. In addition, there was no deterioration of the sintered compact by a treatment with an acid.

(Example 41)

Example 40 was repeated except using a mixture of $CeO_2$ and $SiO_2$, each having a grain diameter of 1 to 2 μm, in a volume ratio of 1:1 as a sintering agent to prepare a diamond sintered compact. The thus obtained sintered compact contained a composite oxide of $CeO_2$ and $SiO_2$ and had a similar hardness, toughness and heat resistance to those of Example 40.

(Example 42)

$Y_2SiO_5$ was used as a sintering agent. A plate-shaped sintered compact of a high purity isotropic graphite with an average grain diameter of 3 μm, having a thickness of 2 mm, and a molded and shaped body of $Y_2SiO_5$ powder with a grain diameter of 1 to 2 μm, having a thickness of 1 mm, were alternately laminated, charged in a Mo capsule, and maintained and sintered at pressure and temperature conditions of 7.5 GPa and 2000° C. for 15 minutes using an ultra-high pressure and high temperature producing apparatus of Belt type. The resulting diamond sintered compact was subjected to identification of the composition by X-ray diffraction to detect about 3 volume % of $Y_2SiO_5$ in addition to diamond.

When the hardness of the sintered compact was estimated by a Knoop indenter, such a high hardness was given as represented by about 7500 kg/mm². When the resulting sintered compact and commercially available Co-binder compact were compared as to the fracture toughness by the indentation method, the former gave a relative toughness of about 1.2 times as large as that of the prior art compact (the latter). When the resulting sintered compact was heat-treated in vacuum at 1200° C. and then subjected to measurement of the hardness and toughness, there was found little change from before the heat treatment. In addition, there was no deterioration of the sintered compact by a treatment with an acid.

(Comparative Example 9)

$Y_2SiO_5$ was used as a sintering agent. Example 34 was repeated except adding a micro amount (about 0.05 volume %) of $Y_2SiO5$ powder with a grain diameter of 1 to 2 μm to a synthetic diamond powder with an average grain diameter of 3.5 M m and adequately mixing them to prepare a raw material, thus obtaining a diamond sintered compact therefrom. However, the thus obtained sintered compact contained more non-sintered parts.

(Comparative Example 10)

$Y_2SiO_5$ was used as a sintering agent. Example 34 was repeated except adding 60 volume % of a synthetic diamond powder with an average grain diameter of 3.5 μm and 40 volume % of $Y_2SiO_5$ powder with a grain diameter of 1 to 2 μm and adequately mixing them to prepare a raw material, thus obtaining a diamond sintered compact therefrom. In the thus obtained sintered compact, however, the grains were not sufficiently bonded with each other to give a low hardness, i.e. about 3500 kg/mm².

(Example 43)

A mixture of $SiO_2$ and $TiO_2$ with a grain diameter of 1 to 2 μm in a proportion of 3:2 ($TiO_2$ 40 volume %) was used as a sintering agent. A synthetic diamond powder with an average grain diameter of 3.5 μm and a powder of the above described mixture were respectively and adequately mixed in a proportion of 95 volume % and 5 volume %, charged in a Mo capsule, and maintained and sintered at pressure and temperature conditions of 7.5 GPa and 2000° C. for 15 minutes using an ultra-high pressure and high temperature producing apparatus of Belt type. The resulting diamond sintered compact was subjected to identification of the composition by X-ray diffraction to detect about 5 volume % of a composite oxide of $SiO_2$ and $TiO_2$, in addition to diamond.

When the hardness of the sintered compact was estimated by a Knoop indenter, such a high hardness was given as represented by 6800 kg/mm². When the resulting sintered compact and commercially available Co-binder compact were compared as to the fracture toughness by the indentation method, the former gave a relative toughness of about 1.3 times as large as that of the prior art compact (the latter). When the resulting sintered compact was heat-treated in vacuum at 1200° C. and then subjected to measurement of the hardness and toughness, there was found little change from before the heat treatment. In addition, there was no deterioration of the sintered compact by a treatment with an acid.

(Example 44)

Example 43 was repeated except adjusting the mixing ratio of $SiO_2$ and $TiO_2$ to 5:1 by volume to prepare a diamond sintered compact. The thus obtained sintered compact contained a composite oxide of $SiO_2$ and $TiO_2$ and had a similar hardness, toughness and heat resistance to those of Example 43.

(Example 45)

Example 43 was repeated except using a mixture of silicic anhydride ($H_3SiO_3$) and $TiO_2$ in a proportion of 2:1 by volume as a sintering agent to prepare a diamond sintered compact. The thus obtained sintered compact contained a composite oxide of $SiO_2$ and $TiO_2$ and had a similar hardness, toughness and heat resistance to those of Example 43.

(Example 46)

Example 43 was repeated except using a mixture of orthosilicic acid ($H_4SiO_4$) and $TiO_2$ in a proportion of 3:1 by volume as a sintering agent to prepare a diamond sintered compact. The thus obtained sintered compact contained a composite oxide of $SiO_2$ and $TiO_2$ and had a similar hardness, toughness and heat resistance to those of Example 43.

(Example 47)

A mixture of $SiO_2$ and $TiO_2$ with a grain diameter of 1 to 2 μm in a proportion of 3:2 by volume was used as a sintering agent. A synthetic diamond powder with an average grain diameter of 15 μm and a powder of the above described mixture were respectively shaped in plates with a thickness of 2 mm and 1 mm, charged in a Mo capsule, and maintained and sintered at pressure and temperature conditions of 7.5 GPa and 2000° C. for 15 minutes using an ultra-high pressure and high temperature producing apparatus of Belt type. The resulting diamond sintered compact was subjected to identification of the composition by X-ray diffraction to detect about 2 volume % of a composite oxide of $SiO_2$ and $TiO_2$, in addition to diamond.

When the hardness of the sintered compact was estimated by a Knoop indenter, such a high hardness was given as represented by 7200 kg/mm². When the resulting sintered compact and commercially available Co-binder compact were compared as to the fracture toughness by the indentation method, the former gave a relative toughness of about 1.4 times as large as that of the prior art compact (the latter). When the resulting sintered compact was heat-treated in vacuum at 1200° C. and then subjected to measurement of the hardness and toughness, there was found little change from before the heat treatment. In addition, there was no deterioration of the sintered compact by a treatment with an acid.

(Example 48)

Example 47 was repeated except using a mixture of silicic anhydride ($H_3SiO_3$) and $TiO_2$ in a proportion of 2:1 by volume as a sintering agent to prepare a diamond sintered compact. The thus obtained sintered compact contained a composite oxide of $SiO_2$ and $TiO_2$ and had a similar hardness, toughness and heat resistance to those of Example 47.

(Example 49)

A mixture of $SiO_2$ and $TiO_2$ in a proportion of 3:2 by volume was used as a sintering agent. A plate-shaped sintered compact of a high purity isotropic. graphite with an average grain diameter of 3 µm, having a thickness of 2 mm, and a molded and shaped body of the above described mixed powder, having a thickness of 1 mm, were alternately laminated, charged in a Mo capsule, and maintained and sintered at pressure and temperature conditions of 7.5 GPa and 2000° C. for 15 minutes using an ultra-high pressure and high temperature producing apparatus of Belt type. The resulting diamond sintered compact was subjected to identification of the composition by X-ray diffraction to detect about 3 volume % of a composite oxide of $SiO_2$ and $TiO_2$ in addition to diamond.

When the hardness of the sintered compact was estimated by a Knoop indenter, such a high hardness was given as represented by about 7000 kg/mm². When the resulting sintered compact and commercially available Co-binder compact were compared as to the fracture toughness by the indentation method, the former gave a relative toughness of about 1.2 times as large as that of the prior art compact (the latter). When the resulting sintered compact was heat-treated in vacuum at 1200° C. and then subjected to measurement of the hardness and toughness, there was found little change from before the heat treatment. In addition, there was no deterioration of the sintered compact by a treatment with an acid.

(Comparative Example 11)

A mixture of $SiO_2$ and $TiO_2$ in a proportion of 3:2 by volume was used as a sintering agent. Example 43 was repeated except adding a micro amount (about 0.05 volume %) of a powder of the above described mixture to a synthetic diamond powder with an average grain diameter of 3.5 µand adequately mixing them to prepare a raw material, thus obtaining a diamond sintered compact therefrom. However, the thus obtained sintered compact contained more non-sintered parts.

(Comparative Example 12)

A mixture of $SiO_2$ and $TiO_2$ in a proportion of 3:2 by volume was used as a sintering agent. Example 43 was repeated except adding 60 volume % of a synthetic diamond powder with an average grain diameter of 3.5 µm and 40 volume % of a powder of the above described mixture and adequately mixing them to prepare a raw material, thus obtaining a diamond sintered compact therefrom. In the thus obtained sintered compact, however, the grains were not sufficiently bonded with each other to give a low hardness, i.e. about 3500 kg/mm².

(Comparative Example 13)

Example 43 was repeated except using only $SiO_2$ as a sintering agent to prepare a diamond sintered compact. However, the thus obtained sintered compact contained more non-sintered parts.

(Comparative Example 14)

Example 43 was repeated except using only $TiO_2$ as a sintering agent to prepare a diamond sintered compact. However, the thus obtained sintered compact contained more non-sintered parts.

(Comparative Example 15)

Example 43 was repeated except using only silicic anhydride as a sintering agent to prepare a diamond sintered compact. However, the thus obtained sintered compact contained more non-sintered parts.

(Example 50)

$Fe_2SiO_4$ was used as a sintering agent. A synthetic diamond powder with an average grain diameter of 3.5 µm and $Fe_2SiO_4$ powder with a grain diameter of 1~2 µm were respectively and adequately mixed in a proportion of 95 volume % and 5 volume %, charged in a Mo capsule, and maintained and sintered at pressure and temperature conditions of 7.5 GPa and 2000° C. for 15 minutes using an ultra-high pressure and high temperature producing apparatus of Belt type. The resulting diamond sintered compact was subjected to identification of the composition by X-ray diffraction to detect about 5 volume % of $Fe_2SiO_4$ in addition to diamond.

When the hardness of the sintered compact was estimated by a Knoop indenter, such a high hardness was given as represented by 8100 kg/mm². When the resulting sintered compact and commercially available Co-binder compact were compared as to the fracture toughness by the indentation method, the former gave a relative toughness of about 1.4 times as large as that of the prior art compact (the latter). When the resulting sintered compact was heat-treated in vacuum at 1200° C. and then subjected to measurement of the hardness and toughness, there was found little change from before the heat treatment. In addition, there was no deterioration of the sintered compact by a treatment with an acid.

(Example 51)

Example 50 was repeated except using a mixture of FeO and $SiO_2$ in a mole ratio of 2:1 as a sintering agent to prepare a diamond sintered compact. The thus obtained sintered compact contained $Fe_2SiO_4$ and had a similar hardness, toughness and heat resistance to those of Example 50.

(Example 52)

$Fe_2SiO_4$ was used as a sintering agent. A synthetic diamond powder with an average grain diameter of 15 µm and $Fe_2SiO_4$ powder with a grain diameter of 1~2 µm were respectively shaped in plates with a thickness of 2 mm and 1 mm, alternately laminated, charged in a Mo capsule, and maintained and sintered at pressure and temperature conditions of 7.5 GPa and 2000° C. for 15 minutes using an ultra-high pressure and high temperature producing apparatus of Belt type. The resulting diamond sintered compact was subjected to identification of the composition by X-ray diffraction to detect about 2 volume % of $Fe_2SiO_4$ in addition to diamond.

When the hardness of the sintered compact was estimated by a Knoop indenter, such a high hardness was given as represented by about 8300 kg/mm². When the resulting sintered compact and commercially available Co-binder compact were compared as to the fracture toughness by the indentation method, the former gave a relative toughness of about 1.4 times as large as that of the prior art compact (the latter). When the resulting sintered compact was heat-treated in vacuum at 1200° C. and then subjected to measurement of the hardness and toughness, there was found little change from before the heat treatment. In addition, there was no deterioration of the sintered compact by a treatment with an acid.

Advantages of the invention

As illustrated above, the diamond sintered compact of the present invention has a higher strength as well as more excellent heat resistance, breakage resistance and corrosion resistance, as compared with those of the prior art, and thus can effectively be applied to tool materials for cutting or polishing of non-ferrous metals or ceramics, and edge materials of drill bits for excavating petroleum.

What is claimed is:

1. A diamond sintered compact comprising (1) 0.1 to 30 volume % of at least one compound containing (a) one or more elements selected from the group consisting of silicon and titanium, and (b) oxygen and (2) the balance of diamond.

2. The diamond sintered compact as claimed in claim 1, wherein the diamond is a powder with a grain diameter of 0.01 to 200 μm.

3. A process for the production of the diamond sintered compact as claimed in claim 1 or 2, comprising mixing a powder of at least one compound containing (a) one or more elements selected from the group consisting of silicon and titanium, and (b) oxygen, as a sintering agent, with diamond powder, non-diamond carbon powder or mixed powders of diamond and non-diamond carbon, and maintaining and sintering the mixture under pressure and temperature conditions in the thermodynamically stable region of diamond.

4. The process for the production of the diamond sintered compact as claimed in claim 3, wherein the sintering agent has a grain size of 0.01 to 10 μm.

5. The diamond sintered compact as claimed in claim 1, wherein the compound is a compound containing (1) at least one metal selected from the group consisting of iron, cobalt, nickel and manganese, (2) titanium and (3) oxygen.

6. The diamond sintered compact as claimed in claim 5, wherein the compound is a titanate of a metal selected from the group consisting of iron, cobalt, nickel and manganese.

7. The diamond sintered compact as claimed in claim 5, wherein the compound is a composite oxide or solid solution consisting of an oxide of a metal selected from the group consisting of iron, cobalt, nickel and manganese, and titanium oxide.

8. A process for the production of the diamond sintered compact as claimed in any one of claims 5 to 7, which comprises mixing a powder of a titanate of a metal selected from the group consisting of iron, cobalt, nickel and manganese, as a sintering agent, with diamond powder, non-diamond carbon powder or mixed powders of diamond and non-diamond carbon, and maintaining and sintering the mixture under pressure and temperature conditions in the thermodynamically stable region of diamond.

9. A process for the production of the diamond sintered compact as claimed in any one of claims 5 to 7, which comprises laminating (1) a shaped body of a powder of a titanate of a metal selected from the group consisting of iron, cobalt, nickel and manganese, and titanium oxide, as a sintering agent, and (2) a shaped body of diamond powder, shaped body of non-diamond carbon powder or shaped body of mixed powders of diamond and non-diamond carbon, and maintaining and sintering the laminate under pressure and temperature conditions in the thermodynamically stable region of diamond.

10. The process for the production of the diamond sintered compact as claimed in any one of claims 5 to 7, which comprises mixing a powder of a mixture of an oxide of a metal selected from the group consisting or iron, cobalt, nickel and manganese, and titanium oxide, as a sintering agents with diamond powder, non-diamond carbon powder or mixed powders of diamond and non-diamond carbon, and maintaining and sintering the mixture under pressure and temperature conditions in the thermodynamically stable region of diamond.

11. The diamond sintered compact as claimed in claim 1, wherein the compound is a compound containing (1) titanium, (2) at least one metal selected from the group consisting of alkali metals and alkaline earth metals, and (3) oxygen.

12. The diamond sintered compact as claimed in claim 11, wherein the compound is a titanate of a metal selected from the group consisting of alkali metals and alkaline earth metals.

13. The diamond sintered compact as claimed in claim 11, wherein the compound is a composite oxide or solid solution consisting of an oxide of a metal selected from the group consisting of alkali metals and alkaline earth metals, and titanium oxide.

14. A process for the production of the diamond sintered compact as claimed in any one of claims 11 to 13, which comprises mixing a powder of a titanate of a metal selected from the the group consisting of alkali metals and alkaline earth metals, as a sintering agent, with diamond powder, non-diamond carbon powder or mixed powders of diamond and non-diamond carbon, and maintaining and sintering the mixture under pressure and temperature conditions in the thermodynamically stable region of diamond.

15. A process for the production of the diamond sintered compact as claimed in any one of claims 11 to 13, which comprises laminating (1) a shaped body of a powder of a titanate of a metal selected from the group consisting of alkali metals and alkaline earth metals, as a sintering agent, and (2) a shaped body of diamond powder, shaped body of non-diamond carbon powder or shaped body of mixed powders of diamond and non-diamond carbon, and maintaining and sintering the laminate under pressure and temperature conditions in the thermodynamically stable region of diamond.

16. The process for the production of the diamond sintered compact as claimed in any one of claims 11 to 13, which comprises mixing a powder of a mixture of an oxide of a metal selected from the group consisting of alkali metals and alkaline earth metals, and titanium oxide, as a sintering agent, with diamond powder, non-diamond carbon powder or mixed powders of diamond and non-diamond carbon, and maintaining and sintering the mixture under pressure and temperature conditions in the thermodynamically stable region of diamond.

17. The diamond sintered compact as claimed in claim 1, wherein the compound is a compound containing a rare earth element, titanium and oxygen.

18. The diamond sintered compact as claimed in claim 17, wherein the compound is a titanate of a rare earth element.

19. The diamond sintered compact as claimed in claim 17, wherein the compound is a composite oxide or solid solution consisting of an oxide of a rare earth element and titanium oxide.

20. A process for the production of the diamond sintered compact as claimed in any one of claims 17 to 19, which comprises mixing a powder of a titanate of a rare earth element as a sintering agent, with diamond powder, non-diamond carbon powder or mixed powders of diamond and non-diamond carbon, and maintaining and sintering the mixture under pressure and temperature conditions in the thermodynamically stable region of diamond.

21. A process for the production of the diamond sintered compact as claimed in any one of claims 17 to 19, which comprises laminating (1) a shaped body of a powder of a titanate of a rare earth element as a sintering agent, and (2) a shaped body of diamond powder, shaped body of non-diamond carbon powder or shaped body of mixed powders of diamond and non-diamond carbon, and maintaining and sintering the laminate under pressure and temperature conditions in the thermodynamically stable region of diamond.

22. The process for the production of the diamond sintered compact as claimed in any one of claims 17 to 19, which comprises mixing a powder of a mixture of an oxide of a rare earth element and titanium oxide, [is used] as a sintering agent, with diamond powder, non-diamond carbon powder or mixed powders of diamond and non-diamond carbon, and maintaining and sintering the mixture under pressure and temperature conditions in the thermodynamically stable region of diamond.

23. The diamond sintered compact as claimed in claim 1, wherein the compound is a compound containing an alkaline earth metal, silicon and oxygen.

24. The diamond sintered compact as claimed in claim 23, wherein the compound is a silicate of an alkaline earth metal.

25. The diamond sintered compact as claimed in claim 23, wherein the compound is a composite oxide or solid solution consisting of an oxide of an alkaline earth metal and silicon oxide.

26. A process for the production of the diamond sintered compact as claimed in any one of claims 23 to 25, which comprises mixing a powder of a silicate of an alkaline earth metal as a sintering agent, with diamond powder, non-diamond carbon powder or mixed powders of diamond and non-diamond carbon, and maintaining and sintering the mixture under pressure and temperature conditions in the thermodynamically stable region of diamond.

27. A process for the production of the diamond sintered compact as claimed in any one of claims 23 to 25, which comprises laminating (1) a shaped body of a powder of a silicate of an alkaline earth metal as a sintering agent, and (2) a shaped body of diamond powder, shaped body of non-diamond carbon powder or shaped body of mixed powders of diamond and non-diamond carbon, and maintaining and sintering the laminate under pressure and temperature conditions in the thermodynamically stable region of diamond.

28. The process for the production of the diamond sintered compact as claimed in any one of claims 23 to 25, which comprises mixing a powder of a mixture of an oxide of an alkaline earth metal and silicon oxide, as a sintering agent, with diamond powder, non-diamond carbon powder or mixed powders of diamond and non-diamond carbon, and maintaining and sintering the mixture under pressure and temperature conditions in the thermodynamically stable region of diamond.

29. The diamond sintered compact as claimed in claim 1, wherein the compound is a compound containing a rare earth element, silicon and oxygen.

30. The diamond sintered compact as claimed in claim 29, wherein the compound is a silicate of a rare earth element.

31. The diamond sintered compact as claimed in claim 29, wherein the compound is a composite oxide or solid solution consisting of an oxide of a rare earth element and silicon oxide.

32. A process for the production of the diamond sintered compact as claimed in any one of claims 29 to 31, which comprises mixing a powder of a silicate of a rare earth element as a sintering agent, with diamond powder, non-diamond carbon powder or mixed powders of diamond and non-diamond carbon, and maintaining and sintering the mixture under pressure and temperature conditions in the thermodynamically stable region of diamond.

33. A process for the production of the diamond sintered compact as claimed in any one of claims 29 to 31, which comprises laminating (1) a shaped body of a powder of a silicate of a rare earth element as a sintering agent, and (2) a shaped body of diamond powder, shaped body of non-diamond carbon powder or shaped body of mixed powders of diamond and non-diamond carbon, and maintaining a sintering the laminate under pressure and temperature conditions in the thermodynamically stable region of diamond.

34. The process for the production of the diamond sintered compact as claimed in any one of claims 29 to 31, which comprises mixing a powder of a mixture of an oxide of a rare earth element and silicon oxide, as a sintering agent, with diamond powder, non-diamond carbon powder or mixed powders of diamond and non-diamond carbon, and maintaining and sintering the mixture under pressure and temperature conditions in the thermodynamically stable region of diamond.

35. The diamond sintered compact as claimed in claim 1, wherein the compound is a compound containing silicon, titanium and oxygen.

36. The diamond sintered compact as claimed in claim 35, wherein the compound is a composite oxide or solid solution consisting of silicon oxide and titanium oxide.

37. A process for the production of the diamond sintered compact as claimed in claim 35 or 36, which comprises mixing a powder of a mixture of silicon oxide and titanium oxide, as a sintering agent, mixing a powder of the mixture with diamond powder, non-diamond carbon powder or mixed powders of diamond and non-diamond carbon, and maintaining and sintering the mixture under pressure and temperature conditions in the thermodynamically stable region of diamond.

38. A process for the production of the diamond sintered compact as claimed in claim 35 or 36, which comprises laminating (1) a shaped body of a powder of a mixture of silicon oxide and titanium oxide, and (2) a shaped body of diamond powder, shaped body of non-diamond carbon powder or shaped body of mixed powders of diamond and non-diamond carbon, and maintaining and sintering the laminate under pressure and temperature conditions in the thermodynamically stable region of diamond.

39. The process for the production of the diamond sintered compact as claimed in claim 37, wherein the mixture of silicon oxide and titanium oxide used as a sintering agent contains the titanium oxide in a proportion of 0.1 to 50 volume %.

40. The process for the production of the diamond sintered compact as claimed in claim 37, wherein the silicon oxide contained in the mixture of silicon oxide and titanium oxide used as a sintering agent is silicic acid or silicon oxide hydrate.

41. The process for the production of the diamond sintered compact as claimed in any one of claims 5 to 7, which comprises laminating (1) a shaped body of a powder of a mixture of an oxide of a metal selected from the group consisting of iron, cobalt, nickel and manganese, and titanium oxide, as a sintering agent, and (2) a shaped body of diamond powder, shaped body of non-diamond carbon powder or shaped body of mixed powders of diamond and non-diamond carbon, and maintaining and sintering the laminate under pressure and temperature conditions in the thermodynamically stable region of diamond.

42. The process for the production of the diamond sintered compact as claimed in any one of claims 11 to 13, which comprises laminating (1) a shaped body of a powder of a mixture of an oxide of a metal selected from the group consisting of alkali metals and alkaline earth metals, and titanium oxide, as a sintering agent, and (2) a shaped body of diamond powder, shaped body of non-diamond carbon powder or shaped body of mixed powders of diamond and non-diamond carbon, and maintaining and sintering the laminate under pressure and temperature conditions in the thermodynamically stable region of diamond.

43. The process for the production of the diamond sintered compact as claimed in any one of claims 17 to 19, which comprises laminating (1) a shaped body of a powder of a mixture of an oxide of a rare earth element and titanium oxide, as a sintering agent, and (2) a shaped body of diamond powder, shaped body of non-diamond carbon powder or shaped body of mixed powders of diamond and non-diamond carbon, and maintaining and sintering the laminate under pressure and temperature conditions in the thermodynamically stable region of diamond.

44. The process for the production of the diamond sintered compact as claimed in any one of claims 23 to 25, which comprises laminating (1) a shaped body of a powder of a mixture of an oxide of an alkaline earth metal and silicon oxide, as a sintering agent, and (2) a shaped body of diamond powder, shaped body of non-diamond carbon powder or shaped body of mixed powders of diamond and non-diamond carbon, and maintaining and sintering the laminate under pressure and temperature conditions in the thermodynamically stable region of diamond.

45. The process for the production of the diamond sintered compact as claimed in any one of claims 29 to 31, which comprises laminating (1) a shaped body of a powder of a mixture of an oxide of a rare earth element and silicon oxide, as a sintering agent, and (2) a shaped body of diamond powder, shaped body of non-diamond carbon powder or shaped body of mixed powders of diamond and non-diamond carbon, and maintaining and sintering the laminate under pressure and temperature conditions in the thermodynamically stable region of diamond.

46. The process for the production of the diamond sintered compact as claimed in claim 38, wherein the mixture of silicon oxide and titanium oxide used as a sintering agent contains the titanium oxide in a proportion of 0.1 to 50 volume %.

47. The process for the production of the diamond sintered compact as claimed in claim 38, wherein the silicon oxide contained in the mixture of silicon oxide and titanium oxide used as a sintering agent is silicic acid or silicon oxide hydrate.

48. The process for the production of the diamond sintered compact as claimed in claim 39, wherein the silicon oxide contained in the mixture of silicon oxide and titanium oxide used as a sintering agent is silicic acid or silicon oxide hydrate.

* * * * *